(12) United States Patent
Li et al.

(10) Patent No.: US 10,434,475 B2
(45) Date of Patent: Oct. 8, 2019

(54) COMPREHENSIVE EVALUATION METHOD FOR PERFORMANCE OF CONTAMINATED FLAT MEMBRANES

(71) Applicant: Jiangnan University, Wuxi (CN)

(72) Inventors: Xiufen Li, Wuxi (CN); Xiaoli Song, Wuxi (CN); Xinhua Wang, Wuxi (CN); Yueping Ren, Wuxi (CN); Xiguang Qi, Wuxi (CN)

(73) Assignee: Jiangnan University, Wuxi, Jiangsu Province (CN)

( * ) Notice: Subject to any disclaimer, the term of this patent is extended or adjusted under 35 U.S.C. 154(b) by 196 days.

(21) Appl. No.: 15/677,022

(22) Filed: Aug. 15, 2017

(65) Prior Publication Data

US 2018/0008935 A1 Jan. 11, 2018

Related U.S. Application Data

(63) Continuation of application No. PCT/CN2015/095725, filed on Nov. 27, 2015.

(30) Foreign Application Priority Data

Oct. 10, 2015 (CN) .......................... 2015 1 0651418

(51) Int. Cl.
*B01D 65/10* (2006.01)
*B01D 69/06* (2006.01)
(Continued)

(52) U.S. Cl.
CPC ............ *B01D 65/10* (2013.01); *B01D 65/02* (2013.01); *B01D 69/06* (2013.01); *B01D 71/30* (2013.01);
(Continued)

(58) Field of Classification Search
None
See application file for complete search history.

(56) References Cited

U.S. PATENT DOCUMENTS

| | | | | |
|---|---|---|---|---|
| 2002/0027111 | A1* | 3/2002 | Ando ................ | B01D 61/142 210/791 |
| 2003/0107150 | A1* | 6/2003 | Hamanaka ........ | B01D 63/024 264/168 |
| 2004/0134856 | A1* | 7/2004 | Fujii ................. | B01D 61/145 210/650 |

FOREIGN PATENT DOCUMENTS

| | | |
|---|---|---|
| CN | 102049199 A | 5/2011 |
| CN | 102580546 A | 7/2012 |

(Continued)

*Primary Examiner* — Richard C Gurtowski
(74) *Attorney, Agent, or Firm* — IPro, PLLC; Na Xu; Qian Gu

(57) ABSTRACT

The present invention relates to a comprehensive evaluation method for the performance of contaminated flat membranes, which relates to the field of sewage and waste resource technology. The present invention firstly analyzed the composition of the surface elements of the contaminated membrane by EDX to determine the type of membrane contamination, and then designed different cleaning schemes for organic or inorganic pollution to obtain a sample membrane. When the tensile strength of the contaminated membrane decreased more than 50% than that of the control membrane, it is a waste membrane; when the tensile strength decreased less than 50% and the membrane flux reduced more than 30%, it is a waste membrane; when tensile strength decreased less than 50%, membrane flux reduced less than 30% and the carbon footprint was more than 188 g, it is a waste membrane; otherwise was a old membrane. The comprehensive evaluation method of the present invention can quantitatively, quickly and comprehensively define the difference between the old membrane (Continued)

and the waste membrane, and provides the basis for the selection of the contaminated membrane and the process of the regeneration and reuse.

3 Claims, 1 Drawing Sheet

(51) Int. Cl.
    *B01D 71/30*     (2006.01)
    *B01D 71/34*     (2006.01)
    *C02F 3/28*     (2006.01)
    *B01D 65/02*     (2006.01)
    *B01D 61/20*     (2006.01)
    *C02F 3/12*     (2006.01)

(52) U.S. Cl.
    CPC ............ *B01D 71/34* (2013.01); *C02F 3/2853* (2013.01); *B01D 61/20* (2013.01); *B01D 2321/162* (2013.01); *B01D 2321/168* (2013.01); *B01D 2321/40* (2013.01); *C02F 3/1268* (2013.01); *C02F 2303/16* (2013.01); *Y02W 10/15* (2015.05)

(56) References Cited

FOREIGN PATENT DOCUMENTS

| | | |
|---|---|---|
| CN | 103674684 A | 3/2014 |
| JP | S59189909 A | 10/1984 |

* cited by examiner

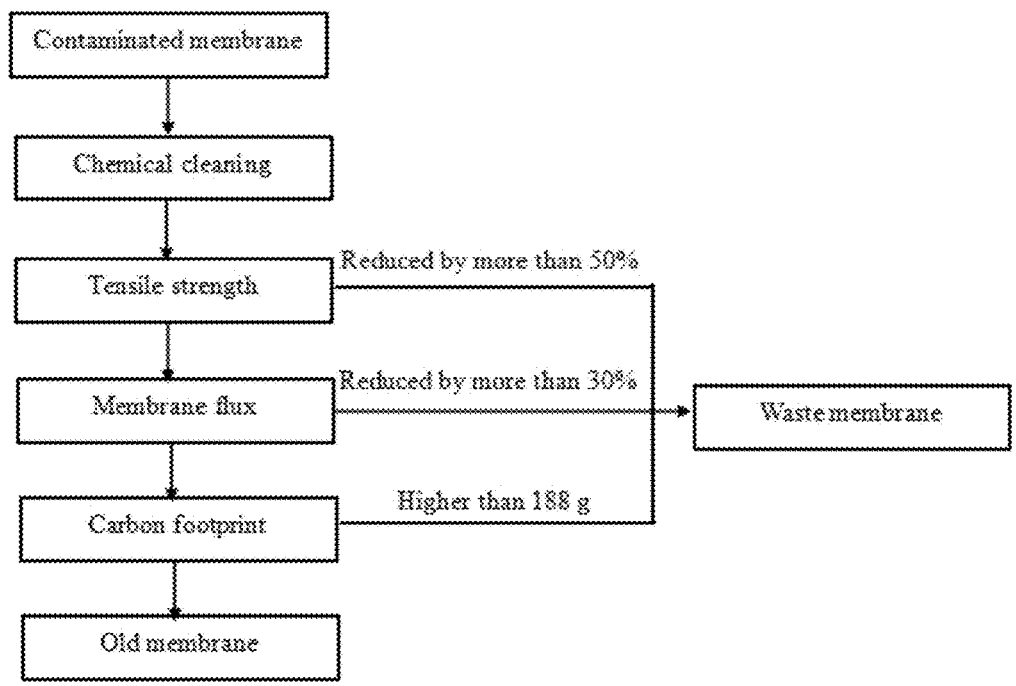

COMPREHENSIVE EVALUATION METHOD FOR PERFORMANCE OF CONTAMINATED FLAT MEMBRANES

BACKGROUND OF THE INVENTION

Field of the Invention

The present invention relates to a comprehensive evaluation method for the performance of contaminated flat membranes, which relates to the field of sewage and waste resource technology.

Description of the Related Art

According to statistics, membrane bioreactor (MBR) in China put into operation or in the construction of sewage treatment project has been more than 300, and nearly 10 sets of them are 10,000-ton MBR system. In the field of sewage treatment applied with membrane technology, China has become one of the fastest growing areas in the world. Membrane separation technology is introduced into the traditional activated sludge system to replace the secondary sedimentation tank in MBR. As the membrane can be a very good solid-liquid separation and retention of macromolecular organic matter, MBR shows advantages that the traditional activated sludge method does not have. Since the late 1970s, the MBR process has been gradually recognized in the field of water treatment, first of all in North America, followed by Japan in the early 1980s (the same period in South Africa: an anaerobic membrane bioreactor), Europe in the middle of the 1990s, China in the late 1990s. As a result, the amount of the separation membrane in the sewage treatment field is enormous.

Taking polyvinylidene fluoride (PVDF) as an example, the annual output of the world is about 33 thousand tons, the output of China is 2000 tons, while the actual demand is 4000 tons. With the increase in the intensity of sewage treatment in the world, the amount of PVDF membrane used in the sewage treatment will increase rapidly. At present, PVDF membranes are widely used in wastewater treatment at home and abroad with a total area of nearly 50 million $m^2$, and the cost of PVDF for hollow fibers is hundreds of millions of dollars. The annual output of lining type PVDF hollow fiber membrane is nearly 10 million $m^2$, and the consumption of raw material for PVDF is about 1200 tons, which worth more than 200 million yuan. However, the service life of PVDF membrane is about 3-7 years. Assume that the service life is 5 years as an example, the replacement of the membrane module accounts for 40% of the annual membrane sales, that is, 20 million $m^2$ of waste membrane will be produced each year.

It is generally believed that the basis for evaluating whether the membrane module can continue to be used or discarded is primarily the membrane flux recovery rate, that is, through a variety of off-line chemical cleaning, if the membrane flux recovery rate is more than 80%, the member can continue to be used. However, in the researched that had been reported, whether the physical and chemical properties including the maximum pore size and tensile strength of the cleaning membrane could satisfy the requirements were not be considered, and whether the difficulty of the cleaning process, the cost and the carbon emissions (carbon footprint) were reasonable were be ignored.

It is worth mentioning that global warming is a serious challenge that must human face for survival and development, and "carbon footprint", "carbon emissions", "low carbon economy", "low carbon technology", "low carbon city" and a series of new concepts, new policy came into being. How to correctly evaluate the cleaning effect and energy consumption of the pollution membrane, how to achieve new technology theory and technology research equally important and common developed with energy conservation and carbon reduction, are difficult problems in the water treatment field.

DETAILED DESCRIPTION

In view of the shortcomings of the existing performance evaluation system of contaminated membrane, the inventors consider various factors that restrict the efficiency and service life of the membrane. After a lot of experiments, the tensile strength is taken as the main evaluation index of physical and chemical properties, the membrane flux as the main evaluating index of filtration performance, the carbon footprint as the main evaluating index of other performance. A quantitative, rapid and comprehensive evaluation method of contaminated membrane performance was established to define the difference between the old membrane and waste membrane and provide a selection basis for the reuse of old membrane and regeneration of contaminated membrane, which maximize achieve the contaminated membrane resources.

The first goal of the present invention is to provide a comprehensive evaluation method for the performance of a contaminated flat membrane, which is described as follows:

Step 1, analyze the composition of the surface elements of the contaminated membrane to identify whether the contaminated membrane is an organic fouling membrane or an inorganic fouling membrane, and then clean it with corresponding chemical cleaning method to obtain the sample membrane to be measured;

Step 2, detect the physical and chemical properties of the sample membrane to obtain the evaluation index value;

Step 3, detect the filtration performance of the sample membrane to obtain the evaluation index value.

Step 4, detect other properties of the sample membrane to obtain the evaluation index value; Step 5, compare the results of the test samples obtained in steps 2~4 with the corresponding values of the control membrane, obtain the evaluation results that whether the contaminated membrane is an old membrane or an waste membrane.

In one embodiment of the present invention, the composition of the surface elements of the membrane is analyzed using an energy dispersive x-ray spectrum (EDX).

In one embodiment of the present invention, the identification of organic fouling membrane and inorganic fouling membrane is as follows: the percentage of carbon element on the organic fouling membrane surface is higher than that of the control membrane and the percentage of carbon element on the inorganic fouling membrane surface is lower than that of the control membrane.

In one embodiment of the present invention, the organic fouling membrane is washed with citric acid or oxalic acid after washing with sodium hypochlorite.

In one embodiment of the present invention, the inorganic fouling membrane is washed with sodium hypochlorite after washing with citric acid or oxalic acid.

In one embodiment of the present invention, the organic fouling membrane is washed with 0.1~5.0% (mass concentration) citric acid or oxalic acid after washing with 0.1~5.0% sodium hypochlorite, and the inorganic fouling membrane was washed with 0.1~5.0% sodium hypochlorite after washing with 0.1~5.0% citric acid or oxalic acid.

In one embodiment of the present invention, the physical and chemical properties includes tensile strength (MPa), which is measured using a tensile strength tester.

In one embodiment of the present invention, the filtration performance includes membrane flux. Said membrane flux is determined as follows: a circular diaphragm is placed in an SCM-300 ultrafiltration cup bottom, the pressure is pressurized by nitrogen after sealed, the liquid volume (A, mL) through the effective membrane area (S, cm$^2$) under a pressure of 0.1 MPa from the start time (t1, min) to the end time (t2, min) is recorded, and the membrane flux (J, L/(m$^2$·h)) is calculated by Formula 1.

$$J = \frac{A \times 60 \times 10^{-3}}{S \times (t_2 - t_1)} \quad (1)$$

In one embodiment of the present invention, the other properties include carbon footprint. The carbon footprint is the $CO_2$ emissions (E, g) during the contaminated membrane off-line chemical cleaning process, including the total energy consumption of the off-line chemical cleaning ($Q_i$, kW·h) and the unit of carbon dioxide for energy consumption (f, 785 g/(kW·h)), which is calculated by Formula 2.

$$E = \sum_{i=1} Q_i \times f \quad (2)$$

In one embodiment of the present invention, said evaluation results are determined according to the following evaluation criteria: when the tensile strength of the contaminated membrane decreases more than 50% than that of the control membrane, it is a waste membrane; when the tensile strength of the contaminated membrane decreases less than 50% and the membrane flux of the contaminated membrane reduced more than 30% than those of the control membrane, it is a waste membrane; when tensile strength of the contaminated membrane decreases less than 50%, membrane flux of the contaminant membrane reduces less than 30% than those of the control membrane, and the carbon footprint of the contaminated membrane is more than 188 g, it is a waste membrane; otherwise is a old membrane.

In one embodiment of the present invention, the contaminated membrane is a flat membrane.

In one embodiment of the present invention, the contaminated membrane is from a membrane bioreactor in sewage treatment.

In one embodiment of the present invention, the control membrane is a new membrane of the same type (flat membrane) and the same material as that of the contaminated membrane.

In one embodiment of the present invention, the material of the contaminated membrane and the control membrane is polyvinylidene fluoride (PVDF) or polyvinyl chloride (PVC).

In one embodiment of the present invention, the surface elements of the control membrane (PVDF) are 48.05% of carbon element and 51.95% of fluorine, the tensile strength of it is 20.0 MPa and membrane flux is 2000 L/(m$^2$·h).

The present invention also provides a method for detecting the performance of a contaminated plate membrane, comprising:

Step 1, detect the percentage of carbon element on the surface of the contaminated membrane, and then compare with the control membrane; the control membrane is a new membrane of the same type and the same material as that of the contaminated membrane;

Step 2, if the percentage of carbon element on the surface of the contaminated membrane is higher than that of the control membrane detected in step 1, then the membrane would be cleaned by citric acid or oxalic acid after be washed by sodium hypochlorite, to obtain the sample membrane; Otherwise, the membrane would be cleaned by sodium hypochlorite after be washed with citric acid or oxalic acid, to obtain the sample membrane;

Step 3, detect the tensile strength of the sample membrane;

Step 4, detect the membrane flux of the sample membrane;

Step 5, detect the carbon footprint of the sample membrane.

In one embodiment of the present invention, said method comprise: the sample membrane with a tensile strength decreased more than 50% compared with the control membrane is not recovered; the sample membrane with a tensile strength decreased less than 50% and a membrane flux reduced more than 30% compared with the control membrane is not recovered; the sample membrane with a tensile strength decreased less than 50%, a membrane flux reduced less than 30% and a carbon footprint of more than 188 g is not recovered; otherwise, the sample membrane is recycled.

In one embodiment of the present invention, the analysis of the composition of the surface elements of the contaminated membrane, the cleaning solution, the detection of the tensile strength, the detection of the membrane flux, the detection of the carbon footprint or the identification of the type of the contamination membrane and so on, are the same as the comprehensive evaluation method described above.

The present invention firstly analyzed the composition of the surface elements of the contaminated membrane by EDX to determine the type of membrane contamination, and then designed different cleaning schemes for organic or inorganic pollution. After cleaning, the sample membrane was obtained, and then compared the physical and chemical properties, filtration properties and other properties with the control membrane to evaluate the contaminated membrane is a waste membrane or old membrane (that is, to determine whether it is worth to recycle). The inventors had conducted extensive experiments and found that the method used in the present invention has a strong objectivity and can accurately reflect whether the membrane also has the value of continuing use. The comprehensive evaluation method of the contaminated membrane performance of the invention can quantitatively, quickly and comprehensively define the difference between the old membrane and the waste membrane, and provides the basis for the selection of the contaminated membrane and the process of the regeneration and reuse.

BRIEF DESCRIPTION OF DRAWINGS

FIG. 1. is a diagram showing comprehensive evaluation steps for performance of contaminated flat membranes.

EXAMPLES

Example 1

The surface elements of a contaminated PVDF flat membrane, used in municipal wastewater treatment, were 19.47% of carbon element, 3.62% of oxygen, 29.0% of oxygen, 11.24% of phosphorus, 1.45% of calcium, 27.28% of iron, 27.48% of aluminum analyzed by EDX. Compared with the control membrane, the contaminated PVDF flat membrane was identified as an organic fouling membrane.

The contaminated membrane was washed with 1.0% oxalic acid for 3 h and then washed with 0.3% sodium hypochlorite for 3 h to obtain a sample membrane. The tensile strength of the obtained sample membrane was 20.5 MPa, the membrane flux was 1930 L/(m$^2$·h) and the carbon footprint was 47 g. Compared with the control membrane, the contaminated membrane was judged as an old membrane. The contaminated membrane was recyled and continually used to the original sewage treatment project. The results showed that the water quality of the system did not change significantly, the monthly membrane flux decay rate was 3% and chemical cleaning cycle was 6-9 months, which can meet the normal operation needs.

Example 2

The surface elements of a contaminated PVDF flat membrane, used in municipal wastewater treatment, were 65.63% of carbon element, 9.37% of nitrogen, 20.58% of oxygen, 35.74% of fluorine, 1.87% of iron and 0.44% of aluminum analyzed by EDX. Compared with the control membrane, the contaminated PVDF flat membrane was identified as an organic fouling membrane.

The contaminated membrane was washed with 1.0% sodium hypochlorite for 2 h and then washed with 1.0% citric acid for 1 h to obtain a sample membrane. The tensile strength of the obtained sample membrane was 18.5 MPa, the membrane flux was 2100 L/(m$^2$·h) and the carbon footprint was 24 g. Compared with the control membrane, the contaminated membrane was judged as an old membrane. The contaminated membrane was recyled and continually used to the original sewage treatment project. The results showed that the water quality of the system did not change significantly, the monthly membrane flux decay rate was 3% and chemical cleaning cycle was 6-9 months, which can meet the normal operation needs.

Example 3

A contaminated PVDF flat membrane, used in hospital sewage treatment, was analyzed by EDX. The surface elements of the contaminated membrane were 53.99% of carbon element, 15.73% of nitrogen, 23.76% of fluorine, 3.22% of silicon, 2.14% of magnesium, 0.55% of aluminum and 0.61% of aluminum. Compared with the control membrane, the contaminated PVDF flat membrane was identified as an organic fouling membrane.

The contaminated membrane was washed with 5.0% sodium hypochlorite for 2 h and then washed with 0.1% oxalic acid for 4 h to obtain a sample membrane. The tensile strength of the obtained sample membrane was 21.2 MPa, the membrane flux was 1890 L/(m$^2$·h) and the carbon footprint was 39 g. Compared with the control membrane, the contaminated membrane was judged as an old membrane. The contaminated membrane was recyled and continually used to the original sewage treatment project. The results showed that water quality of the system did not change significantly, the monthly membrane flux decay rate was 3% and chemical cleaning cycle was 6-9 months, which can meet the normal operation needs.

Example 4

A polyvinyl chloride (PVC) contaminated flat membrane, used in landfill leachate treatment, was analyzed by EDX. The surface elements of the contaminated membrane were 58.63% of carbon element, 10.01% of nitrogen, 22.58% of oxygen, 1.21% of magnesium, 2.18% of calcium, 1.95% of iron, 3.44% of aluminum. And the surface elements of the control membrane were 37.92% of carbon element and 62.08% of chlorine. The comparison showed that the contaminating membrane was organic pollution.

The contaminated membrane was washed with 0.1% sodium hypochlorite for 2 h and then washed with 5.0% citric acid for 2 h to obtain a sample membrane. The tensile strength of the obtained sample membrane was 19.8 MPa, the membrane flux was 1900 L/(m$^2$·h) and the carbon footprint was 31.4 g. Compared with the control membrane, the contaminated membrane was judged as an old membrane. The contaminated membrane was recyled and continually used to the original sewage treatment project. The results showed that water quality of the system did not change significantly, the monthly membrane flux decay rate was 3% and chemical cleaning cycle was 6-9 months, which can meet the normal operation needs.

Example 5

A contaminated PVDF flat membrane, used in municipal wastewater treatment, was analyzed by EDX. The surface elements of the membrane were 16.45% of carbon element, 2.62% of nitrogen, 33.98% of oxygen, 6.95% of phosphoric acid, 0.69% of calcium, 38.98% of iron and 0.33% of aluminum. Compared with the control membrane, the contaminated membrane was inorganic pollution.

The contaminated membrane was washed with 0.1% oxalic acid for 8 h and then washed with 0.1% sodium hypochlorite for 4 h to obtain a sample membrane. The tensile strength of the obtained sample membrane was 18.8 MPa, the membrane flux was 1390 L/(m$^2$·h) and the carbon footprint was 70.7 g. Compared with the control membrane, the contaminated membrane was judged as a waste membrane. The waste membrane was continually used to the original sewage treatment project, and the results showed that the water quality of the system did not change significantly. However, after one month of operation, the membrane flux was 1210 L/(m$^2$·h), and the hydraulic retention time of the sewage was forced to extend for nearly 4 h, making the plant sewage treatment capacity reduced by 40%, resulting in abnormal operation.

Example 6

A contaminated PVDF flat membrane, used in municipal wastewater treatment, was analyzed by EDX. The surface elements of the membrane were 21.65% of carbon element, 4.98% of nitrogen, 34.23% of oxygen, 5.76% of phosphorus, 1.18% of iron, 3.12% of iron and 0.98% of aluminum. Compared with the control membrane, the contaminated membrane was inorganic pollution.

The contaminated membrane was washed with 5.0% citric acid for 3 h and then washed with 0.5% sodium hypochlorite for 3 h to obtain a sample membrane. The tensile strength of the obtained sample membrane was 9.8 MPa (decreased by about 51%), the membrane flux was 2100 L/(m$^2$·h) and the carbon footprint was 47.1 g. Compared with the control membrane, the contaminated membrane was judged as an waste membrane. The waste membrane was continually used to the original sewage treatment project, and the results showed that the system effluent COD concentration increased by more than 10%. And after running for a month, partial rupture appeared and the membrane lost filtering function. A new membrane was needed to replaced the contaminated membrane, causing serious losses.

Example 7

A contaminated PVDF flat membrane, used in hospital sewage treatment, was analyzed by EDX. The surface elements of the membrane were 12.21% of carbon element, 11.71% of nitrogen, 24.86% of fluorine, 1.25% of silicon, 3.16% of magnesium, 0.75% of calcium, 45.15% of iron and 0.91% of aluminum. Compared with the control membrane, the contaminated membrane was inorganic pollution.

The contaminated membrane was washed with 2.5% oxalic acid for 24 h and washed with 5% sodium hypochlorite for 1 h to obtain a sample membrane. The tensile strength of the obtained sample membrane sample was 17.2 MPa, the membrane flux was 1920 L/($m^2$·h) and the carbon footprint was 188.4 g. Compared with the control membrane, the contaminated membrane was judged as an waste membrane. The waste membrane was continually used to the original sewage treatment project, and the results showed that the water quality of the system did not change significantly. However, the monthly membrane flux decay rate was 38% and after running for a month, the membrane flux was 1190 L/($m^2$·h). The chemical cleaning was needed, which not only increased the cost of cleaning, but also affected normal operation of the sewage treatment plant due to frequent cleaning.

While the present invention has been described in some detail for purposes of clarity and understanding, one skilled in the art will appreciate that various changes in form and detail can be made without departing from the true scope of the invention.

What is claimed is:

1. A method for testing a subject membrane that has been exposed to waste water in a membrane bioreactor (MBR), comprising:

measuring a percentage of carbon element on the subject membrane;

upon determination that the percentage of carbon element on the subject membrane is higher than a percentage of carbon element on a control membrane that is identical to the subject membrane except that the control membrane has not been exposed to waste water, washing the subject membrane using sodium hypochlorite and then using citric acid or oxalic acid; upon determination that the percentage of carbon element on the subject membrane is not higher than the percentage of carbon element on the control membrane, washing the subject membrane using citric acid or oxalic acid and then using sodium hypochlorite;

measuring a tensile strength and a membrane flux of the subject membrane and measuring a carbon footprint of washing the subject membrane;

discarding the subject membrane upon determination that the tensile strength of the subject membrane is lower than 50% of a tensile strength of the control membrane or upon determination that the tensile strength of the subject membrane is not lower than 50% of the tensile strength of the control membrane, the membrane flux of the subject membrane is lower than 70% of a membrane flux of the control membrane, and the carbon footprint is greater than 188 g.

2. The method of claim 1, wherein mass concentration of the sodium hypochlorite is between 0.1% and 5.0%, and mass concentration of the citric acid or oxalic acid is between 0.1% and 5.0%.

3. The method of claim 1, wherein the subject membrane is a polyvinylidene fluoride membrane or a polyvinyl chloride membrane.

* * * * *